J. D. MORGAN.
TRACK REBUILDING.
APPLICATION FILED NOV. 29, 1910.
1,000,431.
Patented Aug. 15, 1911.
6 SHEETS—SHEET 3.
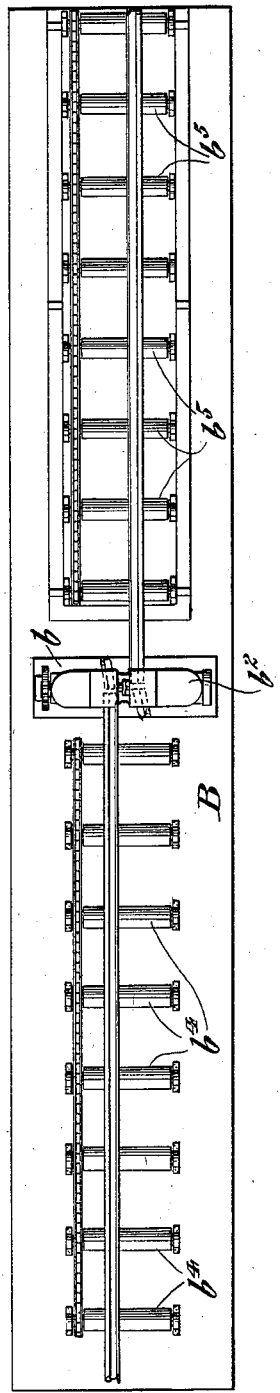
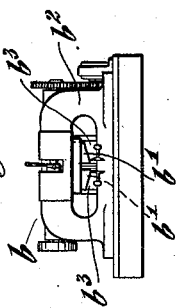
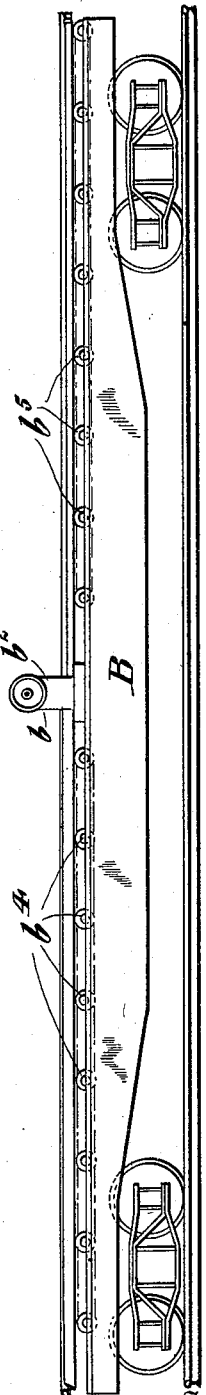
Witnesses:
Geo. Schwartz.
Sully Russo.
Inventor
John Dix Morgan
By his Attorneys
Emery Booth Janney and Varney J. D. MORGAN.
TRACK REBUILDING.
APPLICATION FILED NOV. 29, 1910.
1,000,431.
Patented Aug. 15, 1911.
6 SHEETS—SHEET 4.
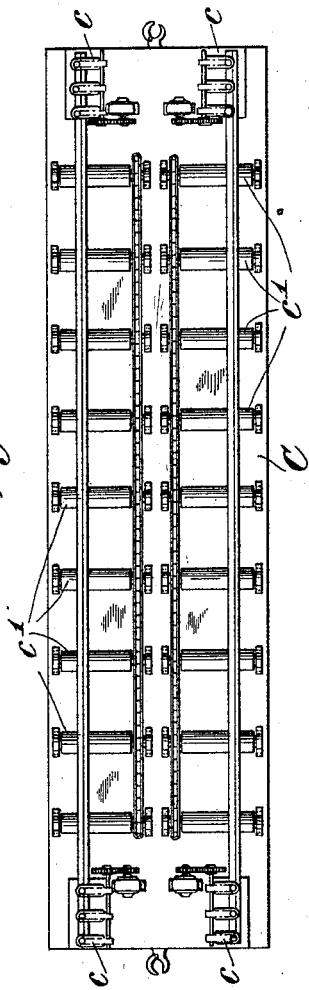
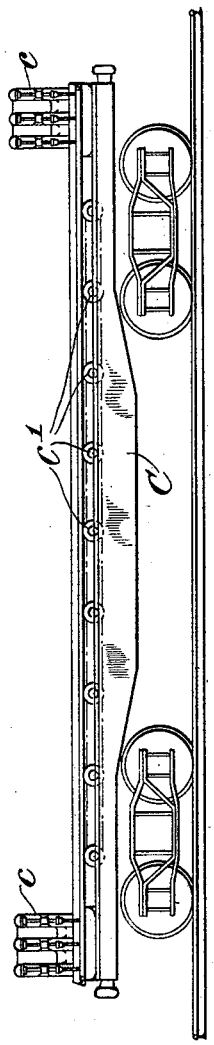

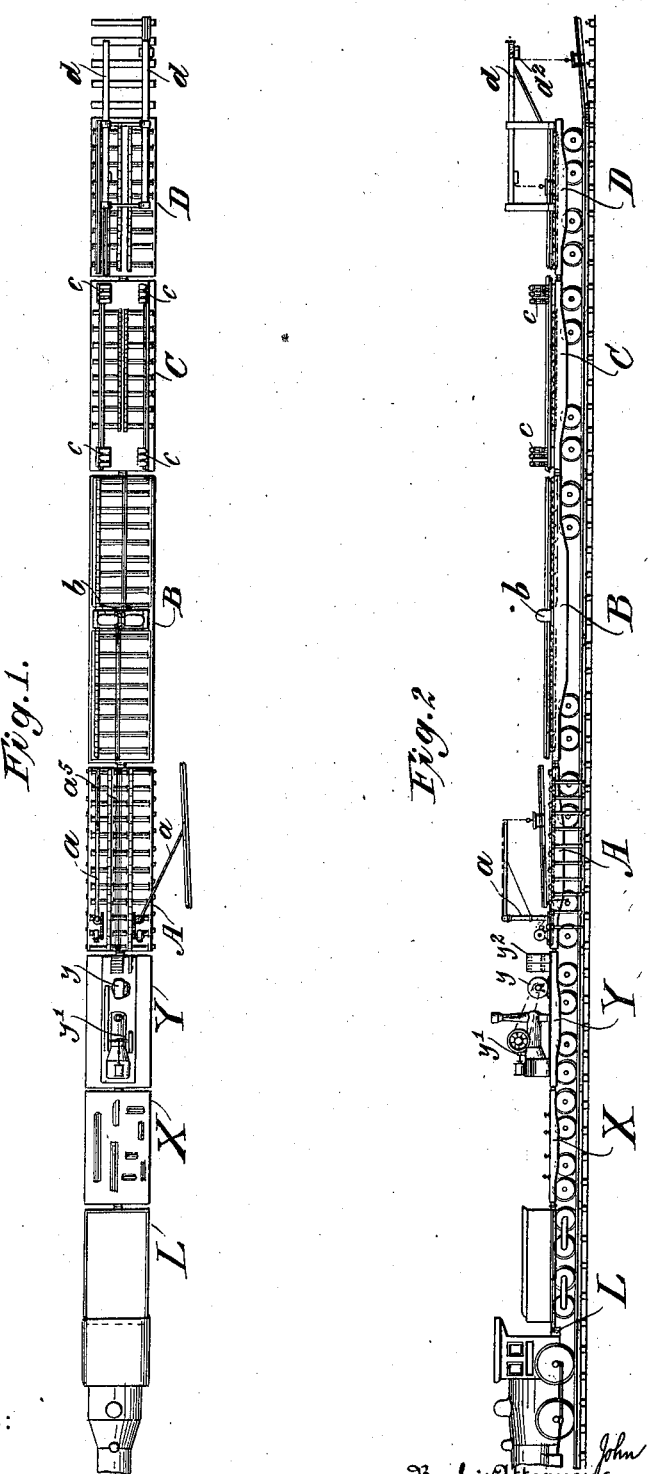

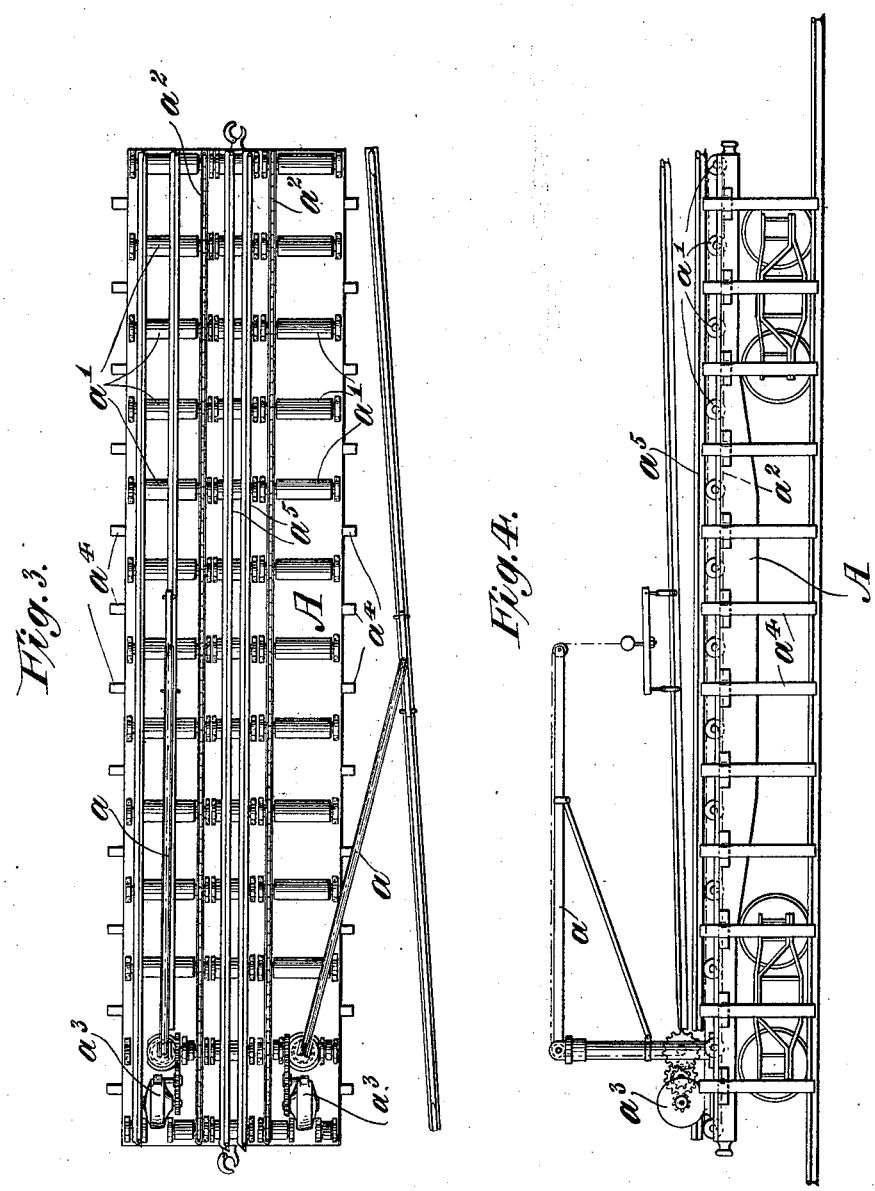

J. D. MORGAN.
TRACK REBUILDING.
APPLICATION FILED NOV. 29, 1910.
1,000,431.
Patented Aug. 15, 1911.
6 SHEETS—SHEET 5.
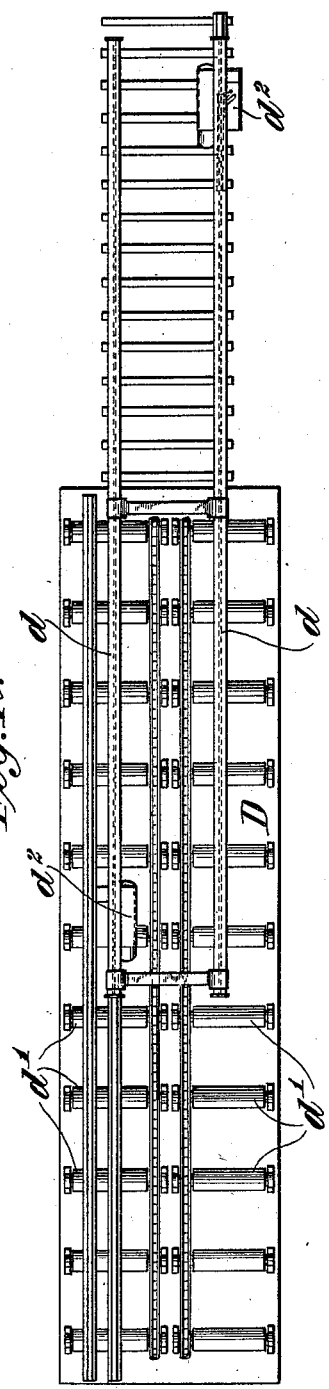
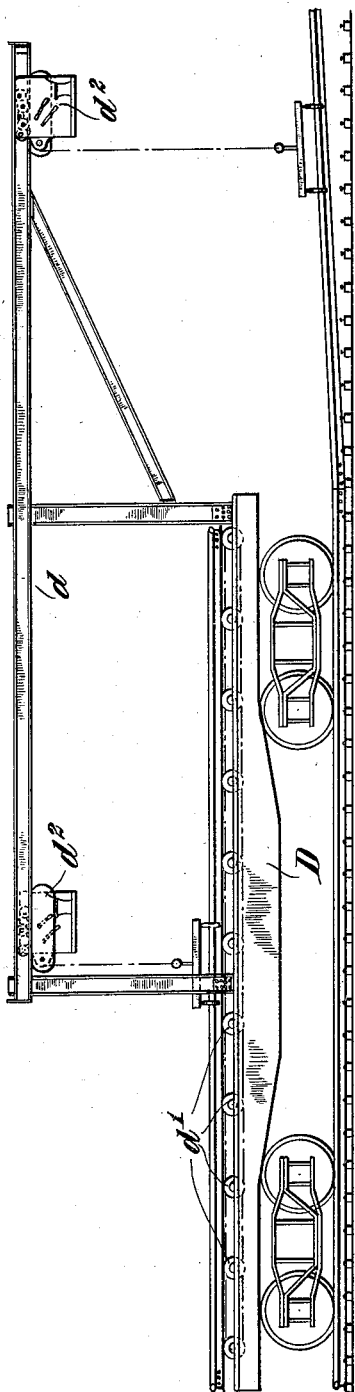

J. D. MORGAN.
TRACK REBUILDING.
APPLICATION FILED NOV. 29, 1910.
1,000,431.
Patented Aug. 15, 1911.
6 SHEETS—SHEET 6.
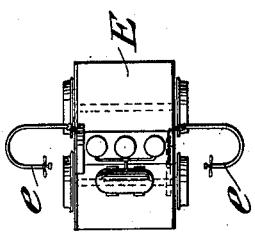
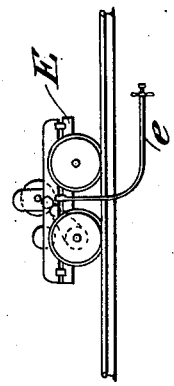
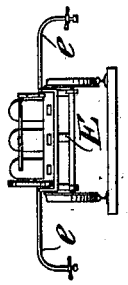
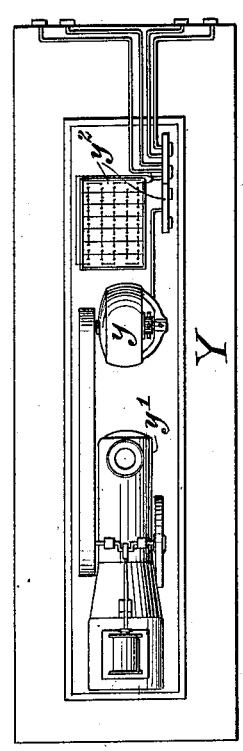
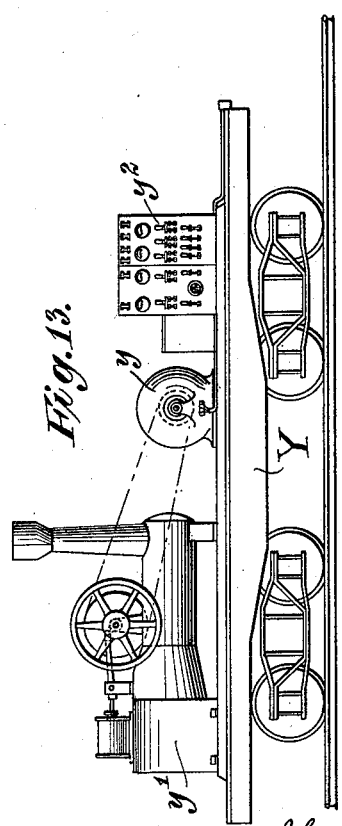
Witnesses:
Inventor
John Dix Morgan
By his Attorneys
Emery Booth Janney and Varney

UNITED STATES PATENT OFFICE.

JOHN DIX MORGAN, OF NEW YORK, N. Y., ASSIGNOR TO JOHN J. McDAVITT, OF POMPTON, NEW JERSEY.

TRACK-REBUILDING.

1,000,431. Specification of Letters Patent. Patented Aug. 15, 1911.

Application filed November 29, 1910. Serial No. 594,628.

*To all whom it may concern:*

Be it known that I, JOHN DIX MORGAN, a citizen of the United States, and temporarily a resident of the borough of Manhattan of the city of New York, in the State of New York, have invented certain new and useful Improvements in Track-Rebuilding, of which the following is a specification, reference being had to the accompanying drawings, forming a part hereof.

The wear and distortion of the rails of a railway at the joints of the rails, due to the constant pounding which the ends of the rails receive, often require the entire rebuilding of the track although the rails thereof are in good condition except for short lengths at their ends; and it is the present practice, in rebuilding such track, to replace all of the old rails with new ones, which method obviously requires that an entire new steel rail shall replace what is virtually a foot or so of worn-out track. The old rails are ultimately sold for what they will bring as old steel, so it is needless to say that such track rebuilding is considerable of an expense to railroad companies.

The present improvements are calculated to furnish a practicable way of utilizing the old rails in reconstructing the track. It has been proposed, heretofore, to remove the ends of the old rails and to make use of them again after they have thus been freed from the worn-out parts; but there has never been any method of rebuilding track embodying such a shortening of the rails which was sufficiently practicable to be adopted and used by the railroads. The removal of the old rails to a distant shop where the necessary operations could be effected upon them required the putting down of new rails in the place of the old ones, unless the track was left torn-up until the old rails were ready to be relaid; and, besides, the hauling of the old rails back and forth and the excessive handling they required were at best items of considerable burden and inconvenience. For these reasons among others, notwithstanding the expense of present track-rebuilding methods, the proposition of relaying track with shortened rails has not met with favor.

According to the present invention, the operation of rebuilding a track is progressive or continuous. It involves the removal of the worn-out ends of the rails, but unlike the procedure adopted or proposed heretofore, the rails are progressively shortened, and relaid as shortened in advance of their former positions to constitute parts of the same track as previously. The operation is continuous from the shortening of the rails to making them again parts of the same track, and may, if desired, be conducted uninterruptedly from the tearing-up of the old rails to the completion of the reconstructed track. In the latter case, where the rails are removed progressively along the track, the shortening and relaying operations following without any substantial break, the entire track may be reconstructed without even putting it out of use.

To explain the invention more fully, reference will now be had to the drawings in which, Figure 1 is a plan view of a reconstructing train that may be employed in carrying out the improvements. Fig. 2 is a view of the same in side elevation. Figs. 3 and 4 are respectively a plan view and a view in side elevation of one of the cars of said train. Figs. 5 and 6 are similar views of another of the cars of said train. Fig. 7 is a detail elevation of a rail cutting device on the car shown in Figs. 5 and 6. Figs. 8 and 9 are respectively a plan view and a view in side elevation of still another car of said train. Figs. 10 and 11 are similar views of still another car of said train. Figs. 12 and 13 are similar views of a power car on said train, and, Figs. 14, 15, and 16 are respectively a plan view, a view in side elevation, and a front view of a small hand car to be used in advance of said train in taking up the rails.

While the improvements, considered in their broadest aspect, may be carried out by means of different apparatuses, it is contemplated that it will be preferable to employ a train moving slowly along the track to be reconstructed and upon which there are a series of mechanisms arranged in proper sequence for performing the necessary mechanical operations incident to machining and relaying the rails. And the invention will therefore be described with reference to such a train which, let it be understood, constitutes part of the improvements sought to be protected herein.

A general plan of the train is shown in Figs. 1 and 2 upon reference to which it will be seen to consist of four cars A, B, C, and D which carry the various mechanisms alluded to above, cars X and Y which are for scrap material and power apparatus respectively, and finally a locomotive L. In advance of this train, that is in advance of the car D which is considered to represent the head of the train, the rails of the track are taken up, and for this purpose it is preferable to employ a small power car just ahead of the train and to which further reference will be made presently. It will suffice here to say that the rails taken up are left beside the ties on each side of the track. As the train advances the rails of the reconstructed track are laid from the car D on its forward end through some such medium as overhanging cranes $d$, the train thus being advanced over the newly laid track and just as fast as the rails can be relaid. The rails lying beside the track are picked up on each side by derricks $a$ on the car A, one after another as this car reaches them in the progress of the train. From said car, they are moved forward longitudinally onto the car B where mechanism $b$ is provided to cut off their ends, after which they are advanced in a similar manner to car C where new fish-plate holes are bored therein. Finally, they are moved ahead once more in the same way to car D from the forward end of which, as has been seen, they are relaid.

It will be understood that the various mechanisms on cars A, B, C and D for effecting the operations just referred to, may be chosen with reference to their efficiency and other qualities and that the details of these mechanisms are quite immaterial to present considerations. In the drawings, however, a complete organization is illustrated for use in practicing the improvements and may be briefly described.

The car A, as was said, is provided with a derrick $a$ on each side for picking up the rails; and these derricks are mounted near the rear end of the car (Figs. 3 and 4) so that the ends of their booms may swing out in a convenient position to pick up the rails on each side respectively and then swing back so as to deposit each rail centrally on one or the other of two sets of rollers $a^1$, depending upon which side of the car the rail is picked up from. The rollers $a^1$ in each set may be united by a sprocket chain $a^2$ or some such device to turn them in a direction to advance the rails forwardly so that each rail, as it is deposited upon car A, is immediately carried along to car B which has the rail-shortening device. The car A may be about 40 feet long and is provided with motors $a^3$ for the derricks and sprocket-chains; and there are preferably depending side strips $a^4$ attached to the sides of the car to prevent the rails from twisting and getting under the car-body while being raised.

The rail-shortening device $b$ is shown to be of the form of a well-known steel cutting machine and has (Fig. 7) a knife $b^1$ and a frame $b^2$ in which there are two holes $b^3$ extending clear through the same and into which each rail may be inserted when it reaches the knife for trimming. This device is located substantially in the center of the car B which may be about 75 feet long. Preceding the cutting-off device is a set of rolls $b^4$ upon which the rails are delivered one by one to said device, the forward end of each rail entering one or the other of the holes $b^3$ and a foot or so being cut off. The rest of the rail is then drawn through the hole $b^3$ onto another set of rolls $b^5$ which is movable laterally to a sufficient extent to bring the rail opposite the other hole $b^3$. The rail is then moved backward through said other hole $b^3$ just enough to permit the knife to trim off a foot or so of the other end of the rail. Thereafter, the rail is advanced on the rolls $b^5$ to the mechanism for making new fish-plate holes. This mechanism may consist of a set $c$ of three drills mounted upon each corner of car C. This car is also provided with two sets of rolls $c^1$, like car A, one at each side of the car, and the rails rest on these rolls while being drilled. Next, the rails are delivered to one or the other of two sets of rolls $d^1$ on car D and are relaid from the forward end thereof by the cranes $d$. The latter are mounted one on each side of the car and project out a considerable distance from its forward end. Each is provided with a trolley $d^2$ from which the rails may be suspended and raised and lowered, as required. When one of the trolleys has advanced toward the end of its crane with a suspended rail, the latter is lowered and its rear end brought, while it is thus being lowered, into its proper position with respect to the end of the track. The fish-plates are then applied and the rail is ready to be spiked to the ties.

In taking up the rails previous to the reconstruction of the track, it is preferable to remove only the spikes on one side of the rails, thus allowing the spikes on one side of each rail to remain in the ties. Then, in relaying the shortened rails, the latter are simply placed against the spikes remaining in the ties, the fish-plates are attached, and the train is advanced over the newly laid track thus formed, the additional spiking being done after the train has passed, that is, in the rear of the train.

The small power car which operates in advance of the train to remove the rails may carry such means as are serviceable in removing the spikes and fish-plates. As shown in Figs. 14–16, this car E carries a flexible shaft $e$ at each side driven by a suitable motor. By means of this shaft, which may be rotated continuously, the nuts holding the fish-plates on may be easily and quickly removed. The spike removing means may, if desired, be conveniently embodied in a tool separate and distinct from this car.

The application of power to operate the several mechanisms shown herein as a part of the train, will be readily understood without specific description. The source of such power, which is preferably electrical, may be in a dynamo $y$ on car Y, the dynamo being run by a suitable engine $y^1$, a suitable switchboard $y^2$ being also provided on car Y. When it happens that the improvements are applied to the rebuilding of an electric railroad, the electric power will often be at hand and such devices as are carried by car Y will not be required. Such matters are, however, one of detail and do not affect the invention.

Whenever the shortening of the rails requires the introduction of a new rail to make up for the cumulative loss, such a rail may be provided in various ways. In the present case, a number of new rails are shown on car A resting upon a central set of rolls $a^5$; and from time to time, as required or at regular intervals, one or more of these rails may be advanced and laid in the same manner as the shortened rails.

Various recourses will suggest themselves, in view of the foregoing, for carrying out the invention; and it will be understood that the illustrated devices and the described embodiment of the improvements are only exemplary.

I claim as my invention:

1. A method of progressively shortening and relaying the rails of a railway, *in situ*, which comprises: removing the rails progressively along the track; replacing them as removed with others; shortening the rails removed; and progressively relaying them in positions in advance of their former positions but to constitute parts of the same track as previously.

2. A method of progressively shortening and relaying the rails of a railway, *in situ*, which comprises: removing the rails progressively along the track; replacing them with others previously shortened; shortening the rails removed; and progressively relaying them in positions in advance of their former positions but to constitute parts of the same track as previously.

3. A method of progressively shortening and relaying the rails of a railway, *in situ*, which comprises: removing the rails progressively along the track; replacing them as removed with others previously shortened; shortening the rails as removed; and progressively relaying them in positions in advance of their former positions but to constitute parts of the same track as previously.

4. A method of progressively shortening and relaying the rails of a railway, *in situ*, which comprises: removing the rails progressively along the track by taking up the spikes on one side only of the rails; replacing them as removed with others previously shortened; shortening the rails as removed; and progressively relaying them against the spikes remaining in the ties and in positions in advance of their former positions but to constitute parts of the same track as previously.

5. A method of progressively shortening and relaying the rails of a railway, *in situ*, which comprises: removing the rails progressively along the track; replacing them as removed with others previously shortened; shortening the rails as removed; progressively relaying them in positions in advance of their former positions but to constitute parts of the same track as previously; and adding new rails from time to time to compensate for the shortening of the old rails.

6. A method of progressively shortening and relaying the rails of a railway, *in situ*, which comprises: removing the rails progressively along the track; replacing them as removed with others previously shortened; shortening the rails as removed, and forming new fish-plate holes therein; and progressively relaying them in positions in advance of their former positions but to constitute parts of the same track as previously.

7. A method of rebuilding track, which consists in taking up the rails thereof; removing the ends of the rails; relaying the shortened rails from the forward end of a train upon said track in advance of their former positions but to constitute parts of the same track as previously; and advancing said train along the newly formed track as fast as the rails are relaid.

8. A method of rebuilding track, which consists in taking up the rails thereof in advance of a train upon said track by removing the spikes on one side only of said rails; removing the ends of the rails upon said train; relaying the shortened rails from the forward end of said train by placing them against the spikes remaining in the ties and applying the fish-plates; advancing said train along the newly formed track as fast as the rails are relaid; and applying the additional spikes to the newly formed track in the rear of said train.

9. The combination, in a carrier adapted to move along a track, of means near the rear end of the carrier to lift rails up onto the carrier, means in advance of the lifting means to remove the ends of the rails, means to advance and guide the rails longitudinally from the lifting means to the end-removing means, means in advance of the end-removing means to form new fish-plate holes in the rails, means to advance and guide the rails longitudinally from the end-removing means to the hole-forming means, and means near the forward end of the carrier to relay the rails.

10. The combination, in a train, of a car having means to lift rails up onto the same, a second car in advance of the first having means to remove the ends of the rails, a third car in advance of the second having means to form new fish-plate holes in the rails, and a fourth car in advance of the third having means to relay the rails.

This specification signed and witnessed this 14th day of November, A. D., 1910.

JOHN DIX MORGAN.

Signed in the presence of—
JOHN W. THOMPSON,
LUCIUS E. VARNEY.

---

Copies of this patent may be obtained for five cents each, by addressing the "Commissioner of Patents, Washington, D. C."